US012358113B2

(12) United States Patent
Moore et al.

(10) Patent No.: US 12,358,113 B2
(45) Date of Patent: Jul. 15, 2025

(54) HYDRAULIC HAMMER INTERNAL DAMPING

(71) Applicant: Caterpillar Inc., Peoria, IL (US)

(72) Inventors: Cody T. Moore, Robinson, TX (US); John K. Clemons, Wamego, KS (US)

(73) Assignee: Caterpillar Inc., Peoria, IL (US)

( * ) Notice: Subject to any disclaimer, the term of this patent is extended or adjusted under 35 U.S.C. 154(b) by 81 days.

(21) Appl. No.: 18/162,941

(22) Filed: Feb. 1, 2023

(65) Prior Publication Data

US 2024/0253199 A1 Aug. 1, 2024

(51) Int. Cl.
*B25D 17/24* (2006.01)
*B25D 9/12* (2006.01)
*B25D 17/06* (2006.01)

(52) U.S. Cl.
CPC ............. *B25D 17/245* (2013.01); *B25D 9/12* (2013.01); *B25D 17/06* (2013.01); *B25D 2209/002* (2013.01)

(58) Field of Classification Search
CPC ........ B25D 17/245; B25D 9/12; B25D 17/06; B25D 2209/002
See application file for complete search history.

(56) References Cited

U.S. PATENT DOCUMENTS 3,487,752 A * 1/1970 James .................... B25D 9/145 92/85 B
3,490,549 A * 1/1970 Catterson ................. B25D 9/12 173/DIG. 4
3,605,916 A 9/1971 Voitsekhovsky et al.
3,866,690 A * 2/1975 Lance .................... B25D 9/145 173/15
4,871,035 A 10/1989 Ekwall
5,056,606 A * 10/1991 Barthomeuf ........... B25D 9/145 173/208
6,901,842 B2 6/2005 Piras
10,245,714 B2 * 4/2019 Moore ..................... B25D 9/12
10,570,930 B2 2/2020 Robson
10,883,249 B2 1/2021 Grzybowski et al.
10,926,394 B2 2/2021 Piras
2011/0303430 A1 * 12/2011 Hartmann ............ B25D 17/245 173/112

(Continued)

FOREIGN PATENT DOCUMENTS

CN 106573366 4/2017

OTHER PUBLICATIONS

Written Opinion and International Search Report for Int'l. Patent Appln. No. PCT/US2024/011781, mailed May 24, 2024 (13 pgs).

*Primary Examiner* — Gloria R Weeks
*Assistant Examiner* — Katie L Gerth

(57) ABSTRACT

A hydraulic hammer includes: a cylinder having a first cylinder end and a second cylinder end opposite the first cylinder end; a piston disposed within the cylinder, the piston having a first piston end, the piston being reciprocatingly movable with respect to the cylinder along an axial direction; a valve body disposed on the first cylinder end so as to define a valve body cavity; and a seal carrier sealingly arranged between the first piston end and the first cylinder end and being reciprocatingly movable with respect to the cylinder along the axial direction. The piston is reciprocatingly movable with respect to the seal carrier along the axial direction.

18 Claims, 4 Drawing Sheets

(56) References Cited

U.S. PATENT DOCUMENTS

| | | | | | |
|---|---|---|---|---|---|
| 2014/0020920 | A1* | 1/2014 | Tang | B25D 9/145 | |
| | | | | 173/90 | |
| 2014/0262406 | A1* | 9/2014 | Moore | B25D 9/20 | |
| | | | | 173/208 | |
| 2014/0262407 | A1* | 9/2014 | Moore | B25D 9/04 | |
| | | | | 173/208 | |
| 2016/0151903 | A1* | 6/2016 | Moore | B25D 17/06 | |
| | | | | 92/169.1 | |
| 2016/0288306 | A1 | 10/2016 | Pillers, II | | |
| 2017/0138376 | A1* | 5/2017 | Moore | F16F 9/082 | |
| 2019/0309498 | A1* | 10/2019 | Grzybowski | E02F 3/966 | |

* cited by examiner

HYDRAULIC HAMMER INTERNAL DAMPING

FIELD

The present disclosure generally relates to an internal damping arrangement for a hydraulic hammer attachable to construction equipment.

BACKGROUND

Hydraulic hammers are tools that convert hydraulic flow to an impact force. A hammer tool mounted to one end of the hammer imparts the impact force on a work object by way of hydraulic flow that causes the hammer tool to reciprocate back and forth with respect to a housing of the hammer. Such hammers can be used to break concrete or rocks and to chip metal slag from pour pots in a foundry, among other applications. Hydraulic hammers can also be used underwater if properly equipped. Due to their size and the need to receive hydraulic flow in order to operate, hydraulic hammers are typically attached to a carrying machine that has its own hydraulic flow, such as a piece of construction equipment. Examples of such equipment include excavators, backhoes, wheel loaders, pedestals, skid steer loaders, and the like. The hydraulic flow of the carrying machine can be extended to the hydraulic hammer to facilitate its operation.

During operation, hydraulic hammers generate a significant amount of power from a piston inside the hammer's housing hitting the hammer tool in order to impart an impact force on the work object. The piston often cycles up to five or ten times per second. The impact of the piston hitting the hammer tool is enough to shake and even break the carrying machine to which the hydraulic hammer is mounted, or at a minimum cause discomfort to the operator of the carrying machine. Moreover, shortly after the piston hits the hammer tool, the piston rebounds away from the hammer tool because of the impact, transferring a corresponding shock load into the upper portion of the hydraulic hammer. The shock loading is then transferred from the hydraulic hammer to the carrying machine. At the same time, because the hammer tool is pushing down on the work object, the hammer tool retracts into the hydraulic hammer upon retraction of the piston. The hammer tool therefore also transfers shock loading from the hydraulic hammer to the carrying machine.

Consequently, there is a need to dampen or isolate the part of the hydraulic hammer including the piston and the hammer tool (i.e., the power cell) from the remainder of the hydraulic hammer (i.e., the housing), and, correspondingly, from the carrying machine. Isolating the power cell also helps to suppress noise and improve feel and control for the carrying machine operator.

Solutions exist to isolate the power cell from the hydraulic hammer housing and at least partially absorb the impact energy. For example, a non-metallic, such as rubber or urethane, can be disposed at one or more locations between the power cell and the housing. Typically, a particularly large piece of non-metallic is disposed between the housing and the part of the power cell opposite the end that includes the hammer tool. Due to its size, however, such large pieces of non-metallic are costly. Moreover, the non-metallic pieces have limited life and reliability. Improvements on existing hydraulic hammer damping systems are therefore needed.

SUMMARY

One aspect of the present disclosure is directed to a hydraulic hammer, comprising: a cylinder having a first cylinder end and a second cylinder end opposite the first cylinder end; a piston disposed within the cylinder, the piston having a first piston end, the piston being reciprocatingly movable with respect to the cylinder along an axial direction; a valve body disposed on the first cylinder end so as to define a valve body cavity; and a seal carrier sealingly arranged between the first piston end and the first cylinder end and being reciprocatingly movable with respect to the cylinder along the axial direction, wherein the piston is reciprocatingly movable with respect to the seal carrier along the axial direction.

Another aspect of the present disclosure is directed to a damping system for a hydraulic hammer, comprising: a cylinder; a piston movably disposed within the cylinder; a seal carrier arranged between a first end of the cylinder and a first end of the piston, the seal carrier providing a sealing of the piston with respect to the cylinder, the seal carrier being movable with respect to the cylinder along an axial direction of the damping system; and a valve body disposed on the first end of the cylinder, wherein the piston is movably disposed with respect to the seal carrier along the axial direction.

DETAILED DESCRIPTION

Figure 1:
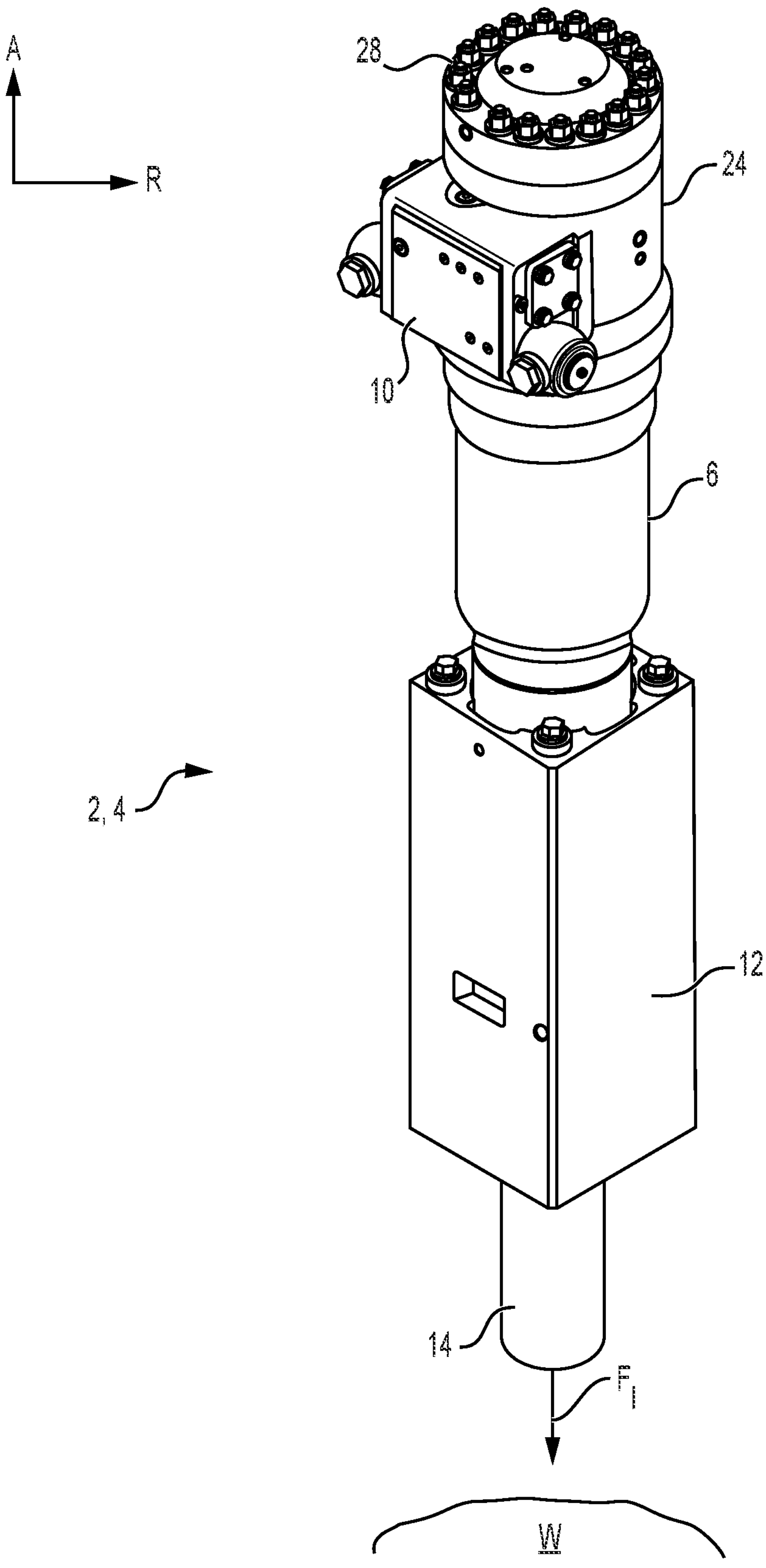
FIG. 1 shows a perspective view of a hydraulic hammer according to an embodiment of the present disclosure.

FIG. 1 shows a hydraulic hammer 2 according to an embodiment of the present disclosure. In particular, FIG. 1 shows a power cell 4 of hydraulic hammer 2. For the sake of clarity, the housing that surrounds power cell 4 is not shown.

Figure 2:
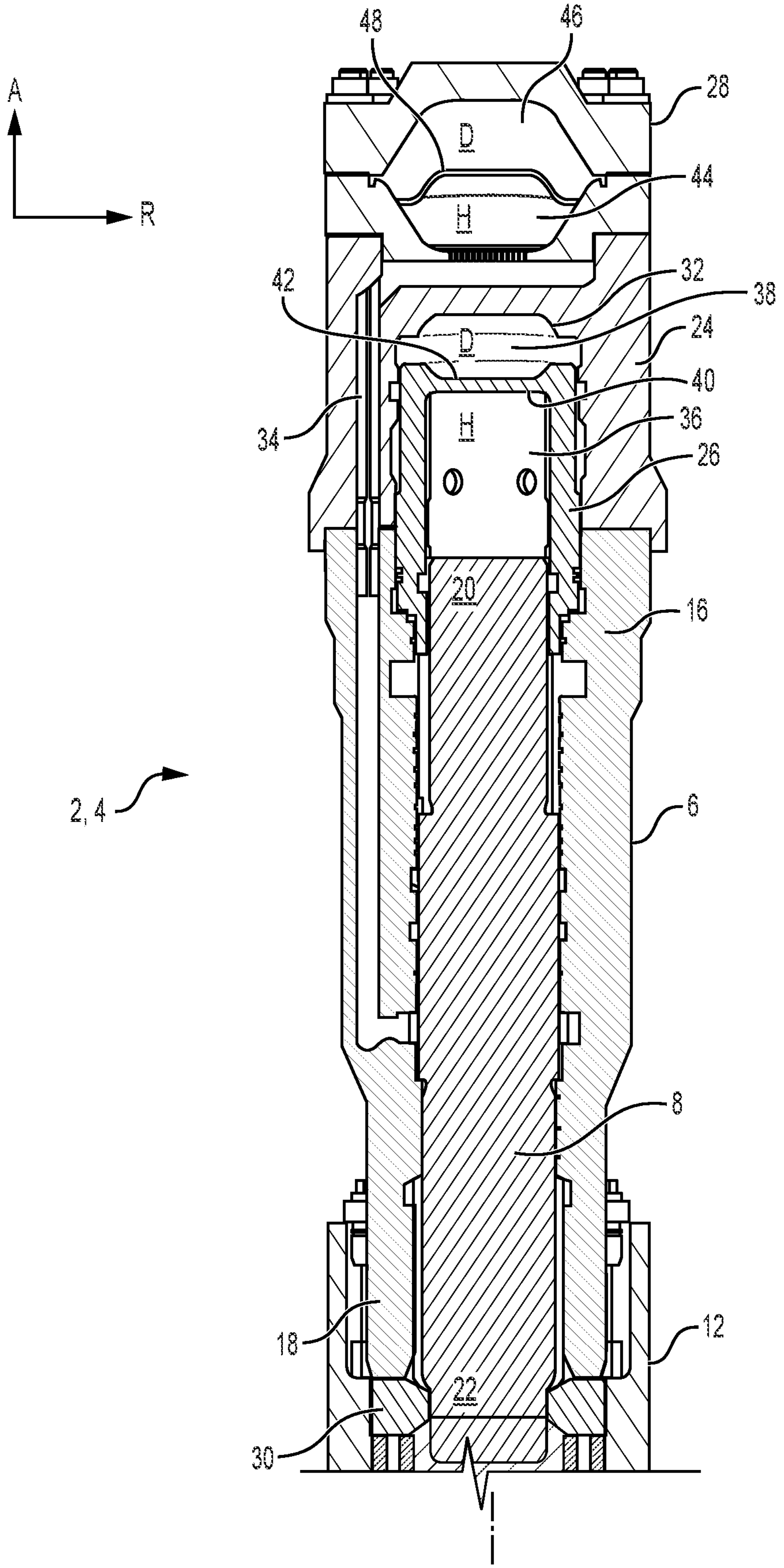
FIG. 2 shows a cross-sectional view of an upper portion of the hydraulic hammer of FIG. 1.
Figure 3:
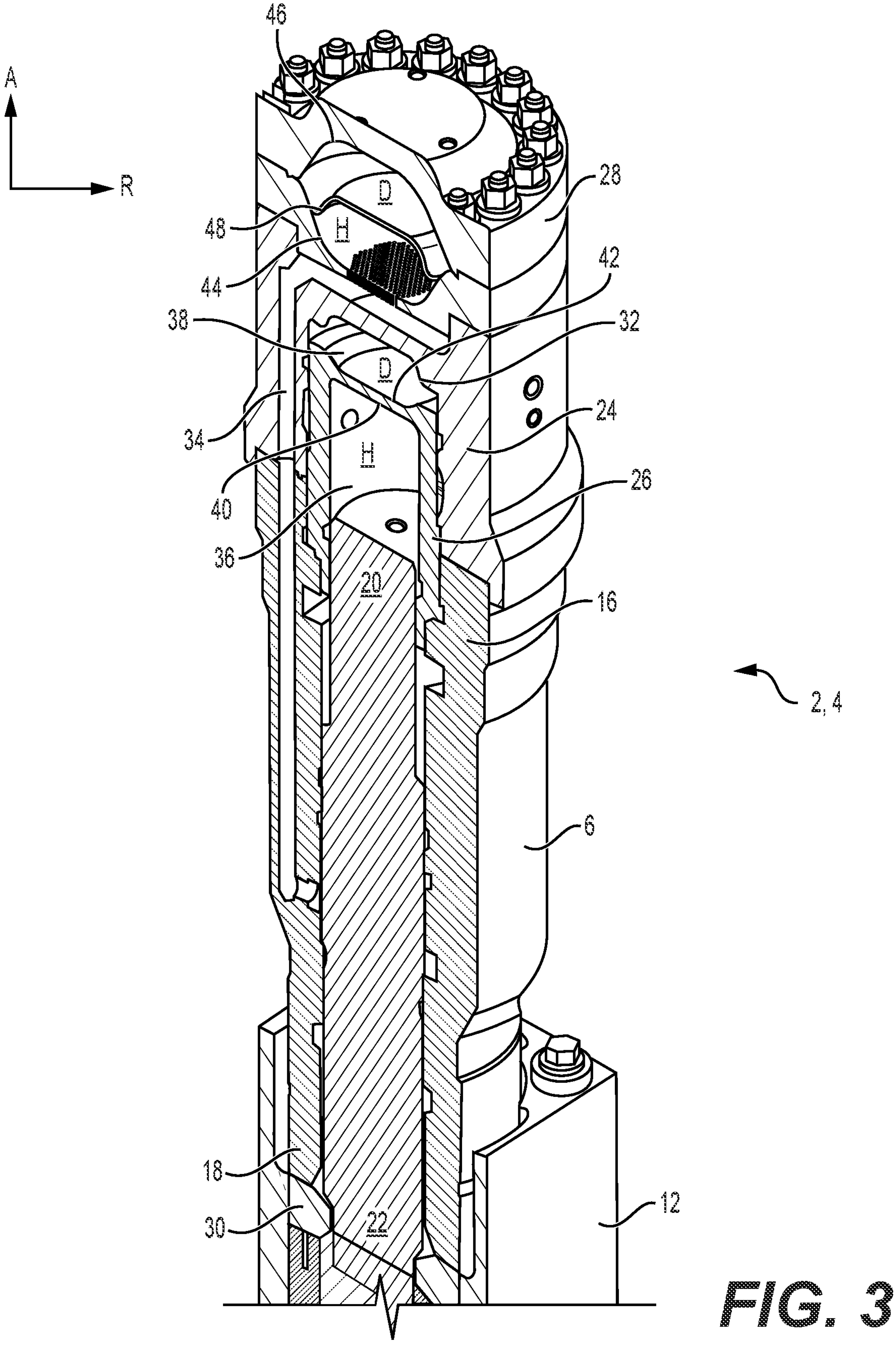
FIG. 3 shows a perspective view of the hydraulic hammer shown in FIG. 2.

Hydraulic hammer 2 includes a cylinder 6. Cylinder 6 generally extends along axial direction A. A piston 8 (as shown in FIGS. 2-3) is disposed within cylinder 6 and radially inward thereof with respect to radial direction R. Piston 8 also generally extends along axial direction A. Piston 8 is reciprocatingly movable with respect to cylinder 6 through use of, for example, hydraulics. For this purpose, hydraulic hammer 2 includes a hydraulic coupling 10. Hydraulic coupling 10 enables hydraulic hammer 2 to be hydraulically connected to a hydraulic circuit of a carrying machine to which hydraulic hammer 2 is to be attached. By controlling the flow of hydraulic fluid, such as mineral oil, natural oil, or water, through the hydraulic circuit, piston 8 reciprocates with respect to cylinder 6.

Hydraulic hammer 2 includes front head 12. Front head 12 is a structure that supports a number of components, including hammer tool 14. Hammer tool 14, in turn, is reciprocatingly movable with respect to front head 12 and cylinder 6 in axial direction A. In particular, within hydraulic hammer 2, piston 8 is axially aligned with hammer tool 14 such that piston 8 is configured to impact hammer tool 14 upon a movement of piston 8 toward front head 12 (i.e., when piston 8 extends). In this manner, hammer tool 14 can be used to impart an impact force $F_I$ on a work object W (e.g., concrete, a rock, metal slag) in order to break apart work object W. During operation of hammer tool 14, front head 12 also passes the carrying machine's external prying forces from hammer tool 14 to the housing of hydraulic hammer 2.

FIGS. 2-3 show cross-sectional views of an upper portion of hydraulic hammer 2. As shown, cylinder 6 has a first cylinder end 16 and a second cylinder end 18 opposite first cylinder end 16. Similarly, piston 8 has a first piston end 20 and a second piston end 22 opposite first piston end 20.

In addition to cylinder 6, piston 8, hydraulic coupling 10, and front head 12, hydraulic hammer 2 also includes valve body 24, seal carrier 26, accumulator 28, and thrust ring 30. Valve body 24 is disposed on first cylinder end 16 of cylinder 6 so as to define a valve body cavity 32. Valve body 24 includes various fluidic channels 34 that, as part of the hydraulic circuit used to operate hydraulic hammer 2, guide hydraulic fluid H between cylinder 6 and accumulator 28 to facilitate the reciprocating movement of piston 8. Thrust ring 30 limits hammer tool 14 from rebounding too far upward within hydraulic hammer 2 after piston 8 strikes hammer tool 14. In this manner, thrust ring 30 acts as a base position within hydraulic hammer 2 from which hammer tool 14 travels outward.

Seal carrier 26 can be disposed radially inward of valve body 24 and, optionally, at least partially within valve body cavity 32 so as to be nested with respect to valve body 24. Seal carrier 26 is sealingly arranged between first piston end 20 of piston 8 and first cylinder end 16 of cylinder 6. In this manner, seal carrier 26 seals piston 8 with respect to cylinder 6. Positioning seal carrier 26 between first piston end 20 of piston 8 and first cylinder end 16 of cylinder 6 creates a piston receiving space 36 adjacent piston 8 and a damping fluid reservoir 38 within valve body cavity 32. Piston 8 is also reciprocatingly movable with respect to seal carrier 26 along axial direction A such that piston receiving space 36 accommodates piston 8 as piston 8 moves upward (i.e., retracts) within hydraulic hammer 2 toward valve body 24 (e.g., when piston 8 rebounds after impacting hammer tool 14). Piston receiving space 36 also contains hydraulic fluid H and is in fluid communication with the hydraulic circuit of the carrying machine by way of fluidic channels 34 and hydraulic coupling 10.

Seal carrier 26 is reciprocatingly movable with respect to cylinder 6 along axial direction A. Due to the presence of hydraulic fluid H in piston receiving space 36, a movement of piston 8 upward within hydraulic hammer 2 toward valve body 24 or second cylinder end 18 (e.g., when piston 8 rebounds after impacting hammer tool 14) correspondingly pushes upward, through hydraulic fluid H, on a piston receiving space side 40 of seal carrier 26 as piston 8 tries to compress hydraulic fluid H within piston receiving space 36.

On the other side of seal carrier 26 within valve body cavity 32, however, is damping fluid reservoir 38. Damping fluid reservoir 38 contains damping fluid D. Damping fluid D may be a compressible fluid, such as nitrogen. Damping fluid D within damping fluid reservoir 38 is also pressurized with a precharged pressure, such that upon compression of damping fluid reservoir 38 by seal carrier 26, damping fluid D exerts a damping force $F_D$ on a damping fluid reservoir side 42 of seal carrier 26. In this manner, any impacts through hydraulic fluid H, whether hydraulic fluid H in piston receiving space 36 or otherwise, are dampened by damping force $F_D$ exerted by damping fluid D in damping fluid reservoir 38. Damping fluid reservoir 38 and its damping fluid D therefore provide internal damping for hydraulic hammer 2 by limiting the upward movement of seal carrier 26, and, correspondingly, piston 8.

In order to vary the amount of damping force $F_D$ and the amount of internal damping for hydraulic hammer 2, the pressure or volume of damping fluid D within damping fluid reservoir 38 may be varied. For example, if damping fluid D in damping fluid reservoir 38 is at a higher pressure or larger volume, damping force $F_D$ exerted on damping fluid reservoir side 42 of seal carrier 26 will be higher, leading to increased internal damping for hydraulic hammer 2. Conversely, if damping fluid D in damping fluid reservoir 38 is at a lower pressure or smaller volume, damping force $F_D$ exerted on damping fluid reservoir side 42 of seal carrier 26 will be lower, leading to decreased internal damping for hydraulic hammer 2.

During operation, a movement of piston 8 toward valve body 24 of second cylinder end 18 (i.e., when piston 8 retracts within cylinder 6) is of greater magnitude than a corresponding movement of seal carrier 26 toward valve body 24. Specifically, a length of travel of piston 8 within cylinder 6 is larger than a length of travel of seal carrier 26 within valve body 24.

Accumulator 28 is disposed on valve body 24. Accumulator 28 has a hydraulic fluid reservoir 44 and a pressure reservoir 46 separated by a membrane 48. Hydraulic fluid reservoir 44 contains hydraulic fluid H and is fluid communication (e.g., by way of fluidic channels 34) with cylinder 6 through valve body 24. Hydraulic fluid reservoir 44 is also in fluid communication with the hydraulic circuit of the carrying machine by way of hydraulic coupling 10.

Hydraulic fluid H within hydraulic fluid reservoir 44 is pressurized to varying levels depending on the phase in which hydraulic hammer 2 is operating (e.g., startup, lifting cycle, firing cycle, return cycle, etc.) in order to reciprocatingly move piston 8. Pressure reservoir 46 is disposed adjacent hydraulic fluid reservoir 44 within accumulator 28. Pressure reservoir 46 contains a damping fluid, which may be damping fluid D or some other damping fluid. Damping fluid D within pressure reservoir 46 is also pressurized such that damping fluid D exerts a damping force on membrane 48. In this manner, pressure reservoir 46 can provide supplemental hydraulic fluid H to hydraulic fluid reservoir 44 on as as-needed basis. Operation of accumulator 28 is discussed in more detail in U.S. Pat. No. 9,308,635, which is incorporated by reference.

Figure 4:
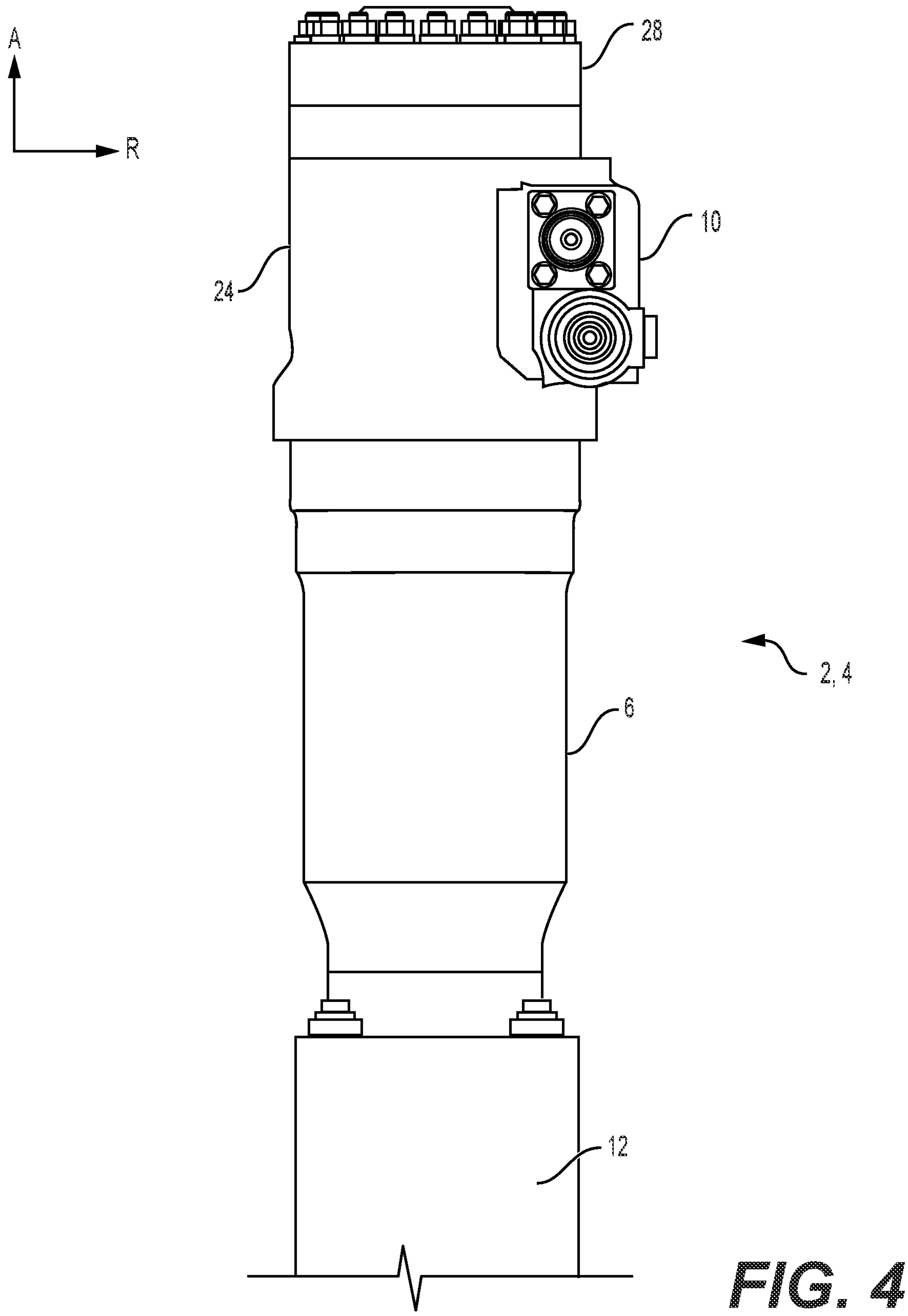
FIG. 4 shows a side view of an upper portion of the hydraulic hammer of FIG. 1.

FIG. 4 shows a side view of an upper portion of hydraulic hammer 2 of FIG. 1.

INDUSTRIAL APPLICABILITY

In general, the hydraulic hammer and damping system of the present disclosure are applicable for use in various industrial applications, including the breaking apart of a work object, such as rock, pavement, concrete, or metal slag on pour pots in a foundry. The hydraulic hammer is attached to a carrying machine, such as construction equipment, and is powered by interfacing with the hydraulic circuit of the carrying machine.

Using the hydraulic hammer and damping system according to the present disclosure obviates the need to use a non-metallic suspension system in order to dampen and absorb the impact energy generated during operation of the hydraulic hammer. Eliminating non-metallic components, which have limited life and reliability, lowers costs. Despite eliminating such parts, the hydraulic hammer and damping system described herein still provide improved comfort for the operator of the carrying machine to which the hydraulic hammer is attached.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A hydraulic hammer, comprising:

a cylinder having a first cylinder end and a second cylinder end opposite the first cylinder end;

a piston disposed within the cylinder, the piston having a first piston end, the piston being reciprocatingly movable with respect to the cylinder along an axial direction;

a valve body disposed on the first cylinder end so as to define a valve body cavity; and a seal carrier sealingly arranged between the first piston end and the first cylinder end and being reciprocatingly movable with respect to the cylinder along the axial direction, wherein the piston is reciprocatingly movable with respect to the seal carrier along the axial direction, wherein positioning the seal carrier between the first piston end and the first cylinder end creates a piston receiving space between the first piston end and a damping fluid reservoir within the valve body cavity, and wherein the seal carrier fluidically separates the damping fluid reservoir from the piston receiving space.

2. The hydraulic hammer of claim 1, wherein a damping fluid is disposed within the damping fluid reservoir.

3. The hydraulic hammer of claim 2, wherein, upon a movement of the seal carrier toward the valve body, the damping fluid exerts a damping force on the seal carrier so as to dampen the movement of the seal carrier toward the valve body.

4. The hydraulic hammer of claim 3, wherein the damping fluid comprises nitrogen.

5. The hydraulic hammer of claim 1, wherein a magnitude of a movement of the seal carrier toward the valve body is smaller than a magnitude of a movement of the piston toward the first cylinder end.

6. The hydraulic hammer of claim 1, further comprising:

an accumulator, comprising:

a hydraulic fluid reservoir in fluid communication with the cylinder through at least one fluidic channel in the valve body; and a pressure reservoir disposed adjacent the hydraulic fluid reservoir.

7. The hydraulic hammer of claim 6, wherein the accumulator is disposed on the valve body.

8. The hydraulic hammer of claim 6, wherein the hydraulic fluid reservoir is in fluid communication with a hydraulic circuit of a carrier equipment of the hydraulic hammer.

9. The hydraulic hammer of claim 1, further comprising:

a front head disposed at the second cylinder end.

10. The hydraulic hammer of claim 9, further comprising:

a hammer tool disposed at the front head, the hammer tool being reciprocatingly movable with respect to the cylinder in the axial direction, wherein the piston is axially aligned with the hammer tool such that the piston is configured to impact the hammer tool upon a movement of the piston toward the second cylinder end.

11. The hydraulic hammer of claim 1, further comprising:

a hydraulic coupling in fluid communication with a hydraulic circuit of a carrier equipment of the hydraulic hammer.

12. The hydraulic hammer of claim 11, wherein the valve body comprises at least one fluidic channel in fluid communication with the hydraulic coupling.

13. A damping system for a hydraulic hammer, comprising:

a cylinder;

a piston movably disposed within the cylinder;

a seal carrier arranged between a first end of the cylinder and a first end of the piston, the seal carrier providing a sealing of the piston with respect to the cylinder, the seal carrier being movable with respect to the cylinder along an axial direction of the damping system; and a valve body disposed on the first end of the cylinder, wherein the piston is movably disposed with respect to the seal carrier along the axial direction, wherein the valve body defines a valve body cavity, wherein positioning the seal carrier between the first piston end and the first cylinder end creates a piston receiving space between the first piston end and a damping fluid reservoir within the valve body cavity, and wherein the seal carrier fluidically separates the damping fluid reservoir from the piston receiving space.

14. The damping system of claim 13, wherein a movement of the piston toward the first end of the cylinder is configured to cause a movement of the seal carrier toward the valve body.

15. The damping system of claim 14, wherein the movement of the seal carrier toward the valve body is configured to compress the damping fluid reservoir so as to dampen the movement of the seal carrier toward the valve body.

16. The damping system of claim 14, wherein a magnitude of the movement of the seal carrier toward the valve body is smaller than a magnitude of the movement of the piston toward the first end of the cylinder.

17. The damping system of claim 13, further comprising:

a hydraulic coupling in fluid communication with a hydraulic circuit of a carrier equipment of the hydraulic hammer.

18. The damping system of claim 17, wherein the valve body comprises at least one fluidic channel in fluid communication with the hydraulic coupling.

* * * * *